US009924084B2

(12) United States Patent
Ono

(10) Patent No.: US 9,924,084 B2
(45) Date of Patent: Mar. 20, 2018

(54) AUTO-TRACKING IMAGING APPARATUS INCLUDING WIDE-ANGLE AND TELEPHOTO OPTICAL SYSTEMS

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/206,617

(22) Filed: Jul. 11, 2016

(65) Prior Publication Data

US 2016/0323504 A1 Nov. 3, 2016

Related U.S. Application Data

(63) Continuation of application No. PCT/JP2014/083090, filed on Dec. 15, 2014.

(30) Foreign Application Priority Data

Feb. 18, 2014 (JP) ................................. 2014-028339

(51) Int. Cl.
*H04N 5/225* (2006.01)
*G03B 17/00* (2006.01)
(Continued)

(52) U.S. Cl.
CPC ........... *H04N 5/2259* (2013.01); *G03B 15/16* (2013.01); *G03B 17/00* (2013.01); *G03B 17/561* (2013.01);
(Continued)

(58) Field of Classification Search
None
See application file for complete search history.

(56) References Cited

U.S. PATENT DOCUMENTS 6,404,455 B1 6/2002 Ito et al.
6,734,911 B1 5/2004 Lyons
(Continued)

FOREIGN PATENT DOCUMENTS

JP 11-069342 A 3/1999
JP 2003-510666 A 3/2003
(Continued)

OTHER PUBLICATIONS

The extended European search report issued by the European Patent Office dated Feb. 1, 2017, which corresponds to European Patent Application No. 14883490.6-1902 and is related to U.S. Appl. No. 15/206,617.

(Continued)

*Primary Examiner* — Justin P Misleh
(74) *Attorney, Agent, or Firm* — Studebaker & Brackett PC

(57) ABSTRACT

An auto-tracking imaging apparatus according to a preferred aspect of the invention includes: an imaging optical system that is formed of a central optical system, which is a wide-angle optical system disposed on a common optical axis, and an annular optical system which is a telephoto optical system disposed on the common optical axis; a directional sensor that respectively pupil-divides rays incident through the wide-angle and telephoto optical systems so as to selectively receive the rays; a panning/tilting mechanism; an object detection section that detects a tracking target object on the basis of at least a wide-angle image in wide-angle and telephoto images acquired from the directional sensor by an image acquisition section; and a panning/tilting control section that controls the panning/tilting mechanism on the basis of information about a position of the object, which is detected by the object detection section, in the image.

18 Claims, 12 Drawing Sheets

(51) Int. Cl.

| | |
|---|---|
| *G08B 13/196* | (2006.01) |
| *H04N 5/232* | (2006.01) |
| *H04N 9/04* | (2006.01) |
| *G03B 15/16* | (2006.01) |
| *G03B 17/56* | (2006.01) |
| *G03B 41/00* | (2006.01) |

(52) U.S. Cl.

CPC .......... *G03B 41/00* (2013.01); *G08B 13/1963* (2013.01); *G08B 13/19608* (2013.01); *H04N 5/2254* (2013.01); *H04N 5/23212* (2013.01); *H04N 5/23219* (2013.01); *H04N 5/23238* (2013.01); *H04N 5/23245* (2013.01); *H04N 5/23296* (2013.01); *H04N 9/045* (2013.01)

(56) References Cited

U.S. PATENT DOCUMENTS

| | | | | |
|---|---|---|---|---|
| 8,605,197 | B2 | 12/2013 | Ono | |
| 2004/0264013 | A1 | 12/2004 | Matsuki et al. | |
| 2006/0012681 | A1 | 1/2006 | Fujii | |
| 2006/0266835 | A1* | 11/2006 | Tanida | B60R 11/04 235/462.01 |
| 2008/0117326 | A1 | 5/2008 | Nishio | |
| 2009/0135502 | A1 | 5/2009 | Border et al. | |
| 2013/0265507 | A1* | 10/2013 | Ford | G02C 7/04 349/13 |
| 2014/0168498 | A1 | 6/2014 | Ono | |

FOREIGN PATENT DOCUMENTS

| | | | |
|---|---|---|---|
| JP | 2006-033224 | A | 2/2006 |
| JP | 2008-129454 | A | 6/2008 |
| JP | 2010-141671 | A | 6/2010 |
| JP | 2011-505022 | A | 2/2011 |
| JP | 2012-247645 | A | 12/2012 |
| JP | 2012-253670 | A | 12/2012 |
| WO | 03/042743 | A1 | 5/2003 |
| WO | 2012/043211 | A1 | 4/2012 |
| WO | 2013/027488 | A1 | 2/2013 |

OTHER PUBLICATIONS

International Search Report issued in PCT/JP2014/083090; dated Mar. 17, 2015.

Written Opinion issued in PCT/JP2014/083090; dated Mar. 17, 2015.

Ford; "Photonic Systems Integration Laboratory"; the Internet <URL: http:// psilab.ucsd.edu/research/TelescopicContact Lens/ main.html>; Jacobs School of Engineering; University of California at San Diego, U.S.A.

* cited by examiner

B
18

B1
B2
B
B3
B4
FIG. 4C1
R
G
G
B
(GROUP OF CENTRAL LIGHT RECEIVING CELLS)
FIG. 4C2
(GROUPS OF EIGHT PERIPHERAL LIGHT RECEIVING CELLS)

[WIDE-ANGLE IMAGE]

[TELEPHOTO IMAGE]

AUTO-TRACKING IMAGING APPARATUS INCLUDING WIDE-ANGLE AND TELEPHOTO OPTICAL SYSTEMS

CROSS-REFERENCE TO RELATED APPLICATIONS

This application is a Continuation of PCT International Application No. PCT/JP2014/083090 filed on Dec. 15, 2014, which claims priority under 35 U.S.C. § 119(a) to Japanese Patent Application No. 2014-028339 filed on Feb. 18, 2014. Each of the above applications is hereby expressly incorporated by reference, in their entirety, into the present application.

BACKGROUND OF THE INVENTION

1. Field of the Invention

The present invention relates to an auto-tracking imaging apparatus, and particularly relates to an auto-tracking imaging apparatus capable of simultaneously capturing a wide-angle image and a telephoto image.

2. Description of the Related Art

JP1999-69342A (JP-H11-69342A) and JP2006-33224A describe a conventional auto-tracking imaging apparatus capable of simultaneously capturing a wide-angle image and a telephoto image.

Both the systems described in JP1999-69342A (JP-H11-69342A) and JP2006-33224A comprise: a wide-angle camera that captures a wide-angle image; and a telephoto camera that is mounted on an electric pan head (panning/tilting device) and captures a telephoto image. In a basic configuration of the system, the wide-angle camera detects a tracking target object from the captured wide-angle image, and the telephoto camera automatically tracks the object by controlling rotation of the electric pan head on the basis of information about a position of the detected object in the wide-angle image, thereby performing telephoto imaging.

Further, a tracking system in which a camera is mounted on a panning/tilting mount, and which controls the panning/tilting mount such that it captures an object (OBT) subjected to tracking at the center of the field of view of the camera has been proposed. The camera comprises an optical system in which an axis of a narrow-angle lens portion of a central circular part coincides with an axis of a wide-angle lens portion of an annular part surrounding the central circular part, and an image sensor having a central zone, in which a narrow-angle image is formed by the narrow-angle lens portion, and a circumferential zone in which a wide-angle image is formed by the wide-angle lens portion (JP2003-510666A).

Thereby, even if the OBT drops out from the narrow-angle image, the OBT can be captured by using the wide-angle image. Thus, tracking dropout does not occur.

Further, a contact lens, through which the wide-angle and telephoto images can be observed, was proposed by Joseph Ford at the University of California at San Diego (UCSD) ("Photonic Systems Integration Laboratory", the Internet <URL: http://psilab.ucsd.edu/research/Telescopic Contact Lens/main.html>).

By using the configuration of the contact lens in a camera, it is possible to obtain wide-angle and telephoto images.

SUMMARY OF THE INVENTION

Both systems described in JP1999-69342A (JP-H11-69342A) and JP2006-33224A have basic configurations in which the system comprises two independent cameras which are the wide-angle camera and the telephoto camera. Hence, there are problems in that the price of the system is high and the size thereof is also large. Further, the optical axes of the wide-angle camera and the telephoto camera are not the same, and parallax occurs between a wide-angle image and a telephoto image which are captured separately. For this reason, if there is no parallax correction using distance information of the object, (theoretically) precise tracking for the object cannot be performed. Furthermore, since the wide-angle camera is fixed, if the object moves beyond the angle of view of the wide-angle image, a problem arises in that the object cannot be tracked.

On the other hand, in the tracking system described in JP2003-510666A, a problem arises in that it is difficult to design an optical system that smoothly connects a narrow-angle image, which is captured through a narrow-angle lens portion of a central circular part, and a wide-angle image (a fish-eye image in which distortion is not corrected) which is captured through a wide-angle lens portion of an annular part. In addition, a problem arises in that it is difficult to perform tracking of the OBT at the boundary part between the narrow-angle image and the wide-angle image.

That is, on an image sensor, overlapping (butting) between the narrow-angle image and the wide-angle image occurs. In order to avoid the above-mentioned problem, if an optical blocking and separating mechanism is provided, the wide-angle image is formed in an annular shape, and the center part of the wide-angle image is vacant. Accordingly, imaging cannot be performed.

Further, in a case where the central circular part is formed as a telephoto lens and the annular part is formed as a wide-angle lens, it is difficult to design an optical system that smoothly connects the narrow-angle and wide-angle images which are captured through these lenses. In this situation, at the boundary between the telephoto image and the wide-angle image, a region, in which an image is not captured, appears.

The contact lens described in "Photonic Systems Integration Laboratory", the Internet <URL: http://psilab.ucsd.edu/research/Telescopic Contact Lens/main.html> is able to solve the problem of parallax between the wide-angle image and the telephoto image. However, in order to separately obtain two images which are wide-angle and telephoto images, a switching shutter is necessary. For this reason, a complex system is formed. Further, it is not possible to obtain both images at the same time, and thus information of the wide-angle image is not acquired while the telephoto image is being acquired. Accordingly, there is a problem in that precision of tracking is lowered.

The present invention has been made in consideration of the above-mentioned situation, and its object is to provide a small-size and inexpensive auto-tracking imaging apparatus capable of simultaneously acquiring wide-angle and telephoto images, of which the optical axes coincide with each other, through a single imaging section, and reliably capturing the tracking target object by using the telephoto image.

In order to achieve the above-mentioned object, according to an aspect of the present invention, there is provided an auto-tracking imaging apparatus comprising: an imaging optical system that is formed of a first optical system at a central portion thereof and a second optical system which is provided at the periphery of the first optical system and has an optical axis the same as that of the first optical system, where one of the optical systems is a wide-angle optical system, and the other is a telephoto optical system; a directional sensor that has a plurality of pixels constituted of photoelectric conversion elements two-dimensionally arranged and that respectively pupil-divides rays incident through the wide-angle and telephoto optical systems so as to selectively receive the rays; a panning/tilting mechanism that rotates an imaging section, which includes the imaging optical system and the directional sensor, in horizontal and vertical directions; an image acquisition section that respectively acquires a wide-angle image, for which light is received from the directional sensor through the wide-angle optical system, and a telephoto image for which light is received from the directional sensor through the telephoto optical system; an object detection section that detects a tracking target object on the basis of at least the wide-angle image in the wide-angle and telephoto images acquired by the image acquisition section; and a panning/tilting control section that controls the panning/tilting mechanism on the basis of information about a position of the object, which is detected by the object detection section, in the image.

According to the aspect of the present invention, it is possible to simultaneously acquire the wide-angle and telephoto images having a common optical axis through the imaging section (single imaging section) including the directional sensor and the imaging optical system having the above-mentioned configuration. Thus, the tracking target object is detected on the basis of at least the wide-angle image, and the panning/tilting mechanism is controlled on the basis of the information about the position of the detected object in the image, whereby the object is set to be within the telephoto image (to be automatically tracked). Further, even if the object moves at a high speed, it is possible to capture the object by using the wide-angle image. As a result, there is no tracking dropout.

It is preferable that the auto-tracking imaging apparatus according to another aspect of the present invention further comprises a recording section that records at least the telephoto image in the wide-angle and telephoto images acquired by the image acquisition section. Thereby, a desired object can be checked on the basis of the telephoto image which is recorded by the recording section.

In the auto-tracking imaging apparatus according to still another aspect of the present invention, it is preferable that the object detection section detects a moving object on the basis of at least the wide-angle image in the wide-angle and telephoto images continuously acquired by the image acquisition section, and sets the detected moving object as the tracking target object. Since the tracking target object is moving, it is possible to detect a desired object through detection of the moving object.

In the auto-tracking imaging apparatus according to still another aspect of the present invention, it is preferable that the object detection section recognizes a specific object on the basis of at least the wide-angle image in the wide-angle and telephoto images acquired by the image acquisition section, and sets the recognized specific object as the tracking target object. For example, in a case where the specific object is a person, by recognizing the person or a face of the person, it is possible to detect the tracking target object.

In the auto-tracking imaging apparatus according to still another aspect of the present invention, the panning/tilting control section controls the panning/tilting mechanism on the basis of the information about the position of the object, which is detected by the object detection section, in the image, and an angle of view of at least the telephoto image is set to include the detected object. In this case, the panning/tilting mechanism may be controlled such that the detected object is at the center of the telephoto image, and the panning/tilting mechanism may be controlled such that the detected object is within a predetermined range in the vicinity of the center of the telephoto image.

In the auto-tracking imaging apparatus according to still another aspect of the present invention, it is preferable that the object detection section has a first object detection section that detects the object on the basis of the telephoto image acquired by the image acquisition section, and a second object detection section that detects the object on the basis of the wide-angle image acquired by the image acquisition section. In addition, it is preferable that the panning/tilting control section controls the panning/tilting mechanism on the basis of the information about a position of the object, which is detected by the first object detection section, in the telephoto image, and controls the panning/tilting mechanism on the basis of the information about a position of the object, which is detected by the second object detection section, in the wide-angle image when the first object detection section is unable to detect the object.

According to the above-mentioned aspect of the present invention, in a case where the object can be detected on the basis of the telephoto image, the panning/tilting mechanism is controlled on the basis of the information about the position of the detected object in the telephoto image. Thus, it is possible to precisely perform auto-tracking. In contrast, in a case where the object cannot be detected on the basis of the telephoto image, the panning/tilting mechanism is controlled on the basis of the wide-angle image, that is, on the basis of the information about the position of the detected object in the wide-angle image. Thereby, as compared with the control of the panning/tilting mechanism based on the information about the position in the telephoto image, the precision of the auto-tracking is lowered. However, there is no tracking dropout.

It is preferable that the auto-tracking imaging apparatus according to still another aspect of the present invention further comprises a mode selection section that selects a first tracking mode or a second tracking mode. In addition, it is preferable that the panning/tilting control section controls the panning/tilting mechanism on the basis of only the information about the position of the object detected by the second object detection section in the wide-angle image if the mode selection section selects the first tracking mode, controls the panning/tilting mechanism on the basis of the information about the position of the object detected by the first object detection section in the telephoto image if the mode selection section selects the second tracking mode, and controls the panning/tilting mechanism on the basis of the information about the position of the object detected by the second object detection section in the wide-angle image when the first object detection section is unable to detect the object.

Thereby, it is possible to selectively use auto-tracking imaging using the first tracking mode and auto-tracking imaging using the second tracking mode in accordance with the use.

In the auto-tracking imaging apparatus according to still another aspect of the present invention, it is preferable that the first optical system of the imaging optical system is a central optical system that has a circular shape, and the second optical system is an annular optical system that is disposed concentrically around the central optical system. No parallax occurs between the two images captured by the central optical system, which have a circular shape, and the annular optical system which is disposed concentrically around the central optical system. Further, each of the optical systems is rotationally symmetric, and thus preferred as an imaging optical system.

In the auto-tracking imaging apparatus according to still another aspect of the present invention, it is preferable that the annular optical system has a reflective optical system that reflects rays twice or more. Thereby, it is possible to shorten the dimension of the annular optical system in the optical axis direction. As a result, it is possible to reduce the size of the imaging section.

In the auto-tracking imaging apparatus according to still another aspect of the present invention, it is preferable that the first optical system is the wide-angle optical system, and the second optical system is the telephoto optical system.

It is preferable that the auto-tracking imaging apparatus according to still another aspect of the present invention further includes a focus adjustment section that performs focus adjustment of the telephoto optical system. Since the telephoto optical system has a depth of field lower than that of the wide-angle optical system and blurring tends to occur in the telephoto optical system, it is preferable that the focus adjustment is performed thereon. It should be noted that the focus adjustment section may be provided also in the wide-angle optical system, and the wide-angle optical system may perform panning and focusing without the focus adjustment section in the wide-angle optical system.

In the auto-tracking imaging apparatus according to still another aspect of the present invention, the directional sensor may have a micro lens array or a light blocking mask that functions as pupil division means.

According to the present invention, it is possible to simultaneously acquire wide-angle and telephoto images, of which the optical axes coincide with each other, through a single imaging section, and thus it is possible to reduce the size and the cost of the auto-tracking imaging apparatus. Further, the optical axis directions of the wide-angle and telephoto images coincide with each other. Thus, the tracking target object is detected on the basis of at least the wide-angle image, and the panning/tilting mechanism is controlled on the basis of the information about the position of the detected object in the image, whereby the object can be set to be within the telephoto image (to be automatically tracked). Further, even if the object moves at a high speed, it is possible to capture the object by using the wide-angle image. As a result, there is an effect that no tracking dropout occurs.

BRIEF DESCRIPTION OF THE DRAWINGS

FIGS. 4A to 4C2 are diagrams illustrating a color filter array and the like which are disposed in the image sensor.

DESCRIPTION OF THE PREFERRED EMBODIMENTS

Hereinafter, referring to accompanying drawings, embodiments of an auto-tracking imaging apparatus according to the present invention will be described.

<Appearance of Auto-Tracking Imaging Apparatus>

Figure 1:
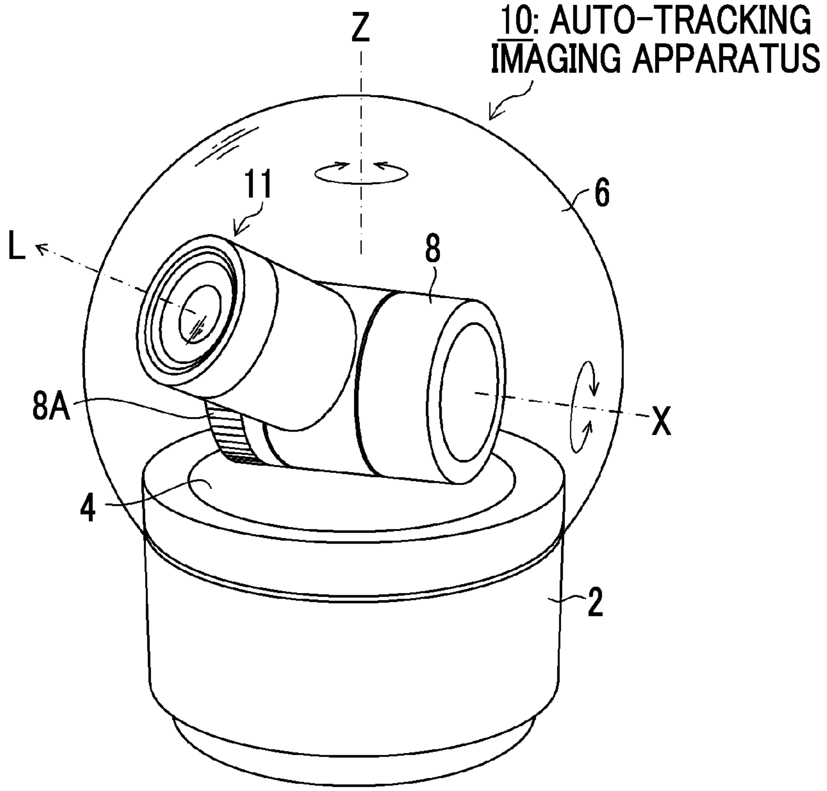
FIG. 1 is a perspective view of an appearance of an auto-tracking imaging apparatus according to the present invention.

FIG. 1 is a perspective view of an appearance of an auto-tracking imaging apparatus according to the present invention.

As shown in FIG. 1, an auto-tracking imaging apparatus 10 mainly has an apparatus main body 2, an imaging section 11, a panning/tilting device 30 (FIG. 5), and a dome cover 6 that covers the imaging section 11.

The panning/tilting device 30 has a pedestal 4 and a holding section 8 that is fixed onto the pedestal 4 and rotatably holds the imaging section 11.

The pedestal 4 is disposed to be rotatable about the axis of the vertical direction Z of the apparatus main body 2. A pan driving section 34 (FIG. 5) rotates about the axis of the vertical direction Z.

The holding section 8 has a gear 8A that is provided on the axis the same as the axis of the horizontal direction X, and transfers the driving force from the tilt driving section 36 (FIG. 5) through the gear 8A, thereby rotating (tilting) the imaging section 11 in the up-down direction.

The dome cover 6 is a vibration-proof and drip-proof cover. It is preferable that the dome cover 6 has a spherical shell shape with a certain thickness at which an intersection point between the axis of the horizontal direction X and the axis of the vertical direction Z is set as a center of a curvature thereof without change in optical performance of the imaging section 11, regardless of an optical axis direction L of the imaging section 11.

Further, it is preferable that a tripod attaching section (such as a tripod screw hole) not shown in the drawing is provided on the rear surface of the apparatus main body 2.

[Configuration of Imaging Section]

Figure 2:
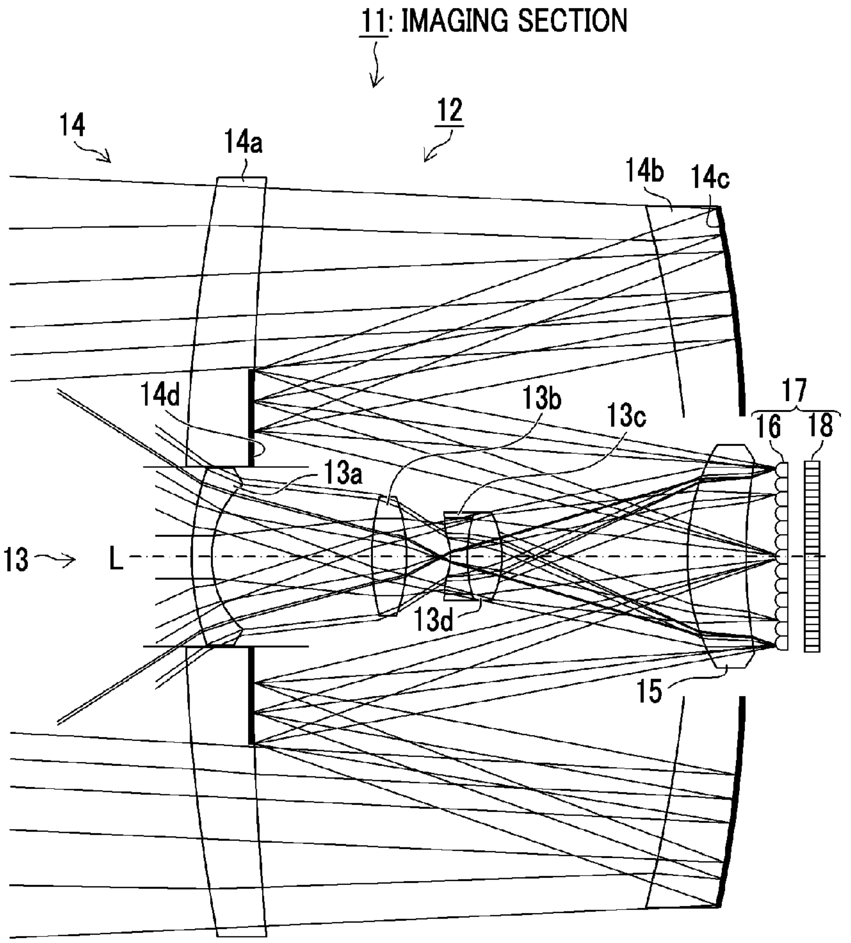
FIG. 2 is a sectional view illustrating a first embodiment of an imaging section of the auto-tracking imaging apparatus.

FIG. 2 is a sectional view illustrating a first embodiment of the imaging section 11 of the auto-tracking imaging apparatus 10.

As shown in FIG. 2, the imaging section 11 includes the imaging optical system 12 and the directional sensor 17.

<Imaging Optical System>

The imaging optical system 12 includes a central optical system 13 as a first optical system at the center portion and an annular optical system 14 as a second optical system having a concentric shape at the periphery. Each optical system is disposed on the same optical axis.

The central optical system 13 is a wide-angle optical system (wide-angle lens) including a first lens 13*a*, a second lens 13*b*, a third lens 13*c*, a fourth lens 13*d*, and a common lens 15, and forms a wide-angle image on a micro lens array 16 constituting the directional sensor 17.

The annular optical system 14 is a telephoto optical system (telephoto lens) including a first lens 14*a*, a second lens 14*b*, a first reflection mirror 14*c* as a reflective optical system, a second reflection mirror 14*d*, and a common lens 15, and forms a telephoto image on a micro lens array 16. Rays, which are incident through the first lens 14*a* and the second lens 14*b*, are reflected twice by the first reflection mirror 14*c* and the second reflection mirror 14*d*, and thereafter pass through the common lens 15. The rays are bent by the first reflection mirror 14*c* and the second reflection mirror 14*d*, whereby a length of the telephoto optical system (telephoto lens) having a long focal length in the optical axis direction is shortened.

<Directional Sensor>

The directional sensor 17 includes a micro lens array 16 and an image sensor 18.

Figure 3:
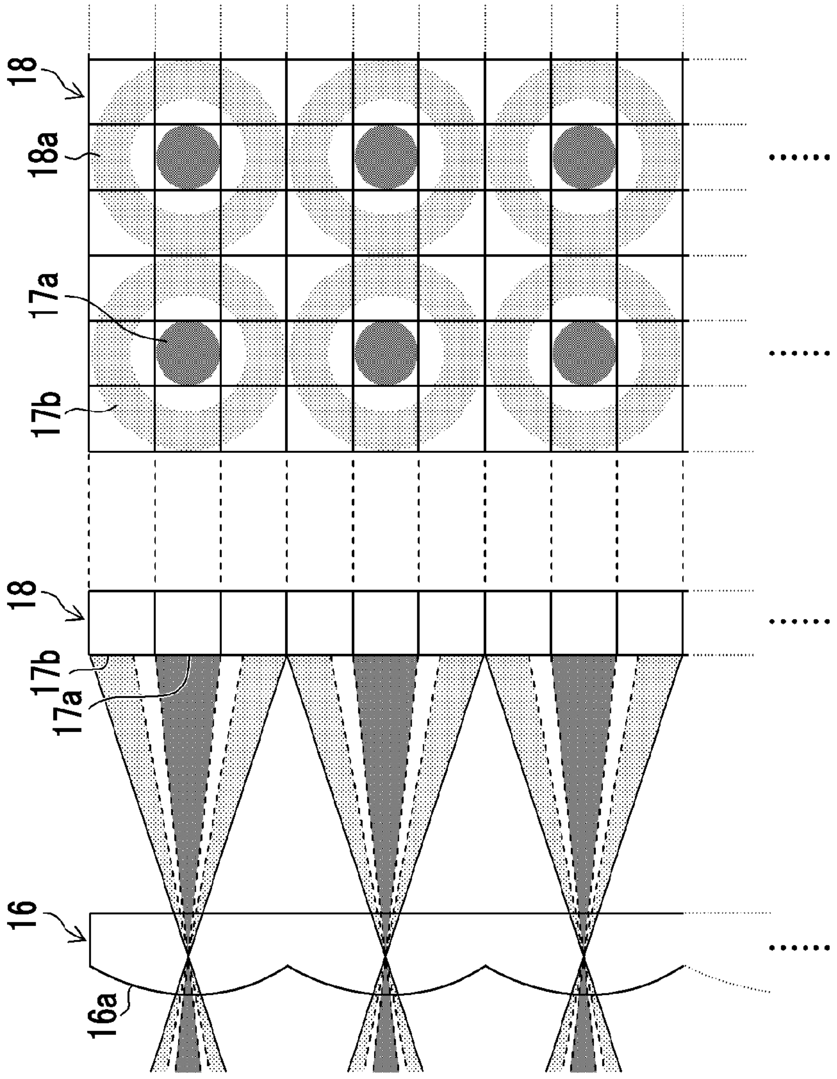
FIG. 3 is an enlarged view of principal sections of a micro lens array and an image sensor shown in FIG. 2.

FIG. 3 is an enlarged view of principal sections of the micro lens array 16 and the image sensor 18.

The micro lens array 16 is configured such that multiple micro lenses (pupil imaging lenses) 16*a* are two-dimensionally arranged. Distances between the micro lenses in the horizontal and vertical directions correspond to distances between three light receiving cells 18*a* as photoelectric conversion elements of the image sensor 18. That is, each micro lens of the micro lens array 16 is formed to correspond to positions of two light receiving cells in each direction of the horizontal and vertical directions.

Further, each micro lens 16*a* of the micro lens array 16 forms a central pupil image (first pupil image) 17*a* having a circular shape and annular pupil image (second pupil image) 17*b*, which correspond to the central optical system 13 and the annular optical system 14 of the imaging optical system 12, on the light receiving cells 18*a* in a corresponding light receiving region of the image sensor 18.

According to the micro lens array 16 and the image sensor 18 shown in FIG. 3, 3×3 light receiving cells 18*a* having a lattice (square lattice) shape are allocated for each one micro lens 16*a* of the micro lens array 16. Hereinafter, a light receiving cell group (3×3 light receiving cells 18*a*) corresponding to one micro lens 16*a* and one micro lens 16*a* is referred to as a unit block.

The central pupil image 17*a* is formed only on the light receiving cell 18*a* at the center of the unit block, and the annular pupil image 17*b* is formed on the eight light receiving cells 18*a* at the periphery of the unit block.

According to the imaging section 11 having the above-mentioned configuration, as described later, a wide-angle image corresponding to the central optical system 13 and a telephoto image corresponding to the annular optical system 14 are captured at the same time.

Embodiment of Image Sensor

Figures 4A, 4B:
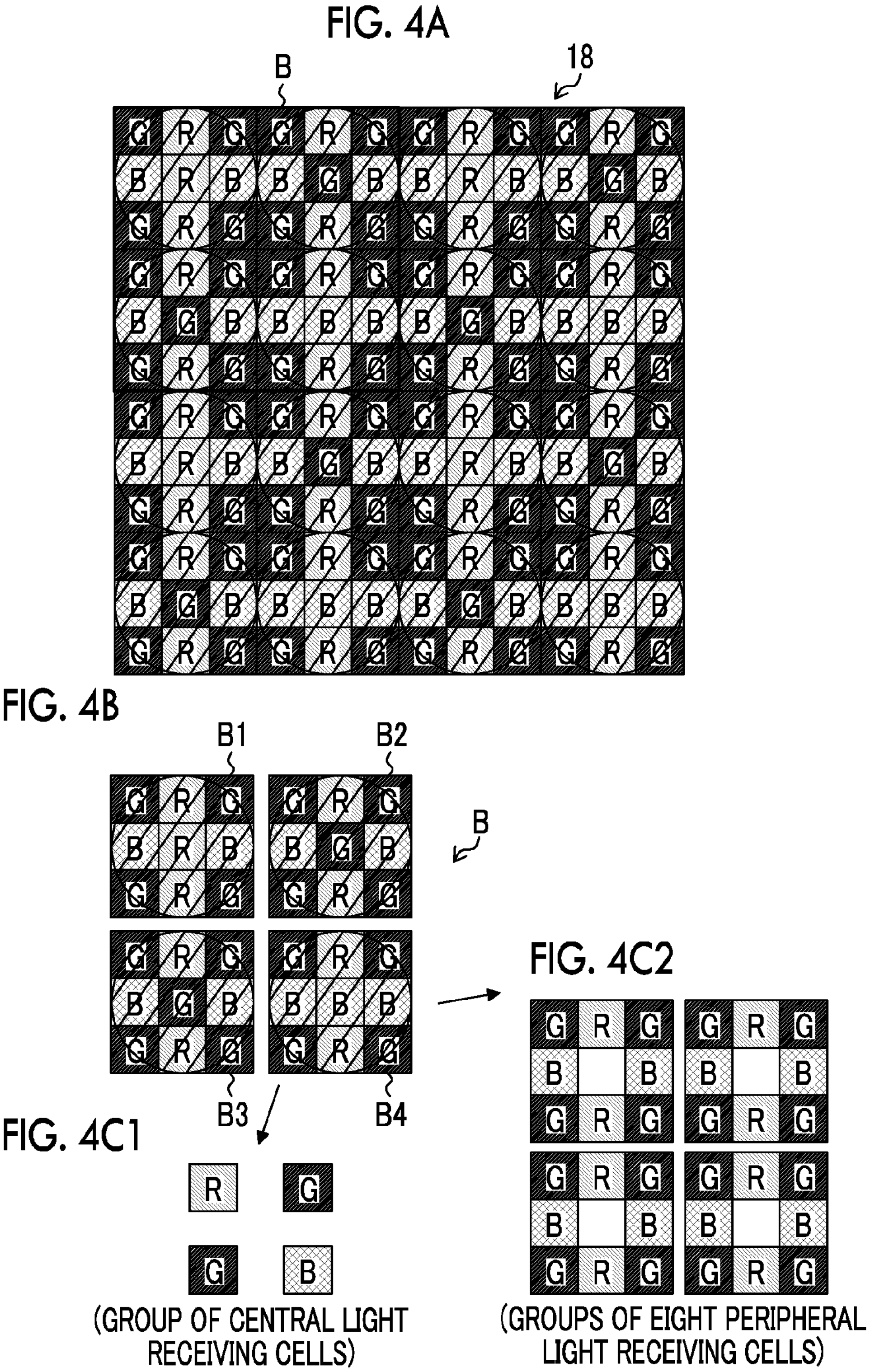

FIGS. 4A to 4C2 are diagrams illustrating a color filter array that is disposed on the image sensor 18. In FIGS. 4A to 4C2, the micro lens array 16 is omitted, but the regions indicated by circles represents unit blocks each including 3×3 light receiving cells on which pupil images are formed by the respective micro lenses 16*a* of the micro lens array 16.

As shown in FIG. 4A, the color filter array formed of color filters disposed on the respective light receiving cells is provided on an imaging surface of the image sensor 18.

The color filter array is formed of color filters (hereinafter referred to as R, G, and B filters) which have three primary colors and through which rays with respective wavelength regions of red (R), green (G), and blue (B) are transmitted. Then, any one of the RGB filters is disposed on each light receiving cell. Hereinafter, the light receiving cell, on which the R filter is disposed, is referred to as an “R light receiving cell”, the light receiving cell, on which the G filter is disposed, is referred to as an “G light receiving cell”, and the light receiving cell, on which the B filter is disposed, is referred to as an “B light receiving cell”.

The color filter array shown in FIG. 4A is configured as follows: 6×6 light receiving cells are set as a basic block B (a block indicated by a large frame of FIG. 4A, and shown in FIG. 4B), and the basic blocks B are repeatedly arranged in the horizontal and vertical directions.

As shown in FIG. 4B, the basic block B is formed of four unit blocks B1 to B4.

FIG. 4C1 shows a group of central light receiving cells (light receiving cells on which rays passing through the central optical system 13 shown in FIG. 3 are incident) of the four unit blocks B1 to B4. FIG. 4C2 shows groups of eight peripheral light receiving cells (light receiving cells on which rays passing through the annular optical system 14 shown in FIG. 3 are incident).

As shown in FIG. 4C1, the image of the group of the central light receiving cells is formed of mosaic images having a Bayer array. Thereby, by performing the demosaic processing on the mosaic images having the Bayer array, it is possible to obtain a color image.

In contrast, as shown in FIG. 4C2, the groups of the central light receiving cells and the eight peripheral light receiving cells of the unit blocks B1 to B4 include all the RGB light receiving cells (R, G, and B light receiving cells) in the eight light receiving cells, and the RGB light receiving cells are arranged with the same pattern regardless of the unit blocks B1 to B4.

Specifically, G light receiving cells are disposed on the four light receiving cells at four corners of each of the unit blocks B1 to B4, R light receiving cells are disposed on the two upper and lower light receiving cells with the central light receiving cell interposed therebetween, and B light receiving cells are disposed on the two left and right light receiving cells with the central light receiving cell interposed therebetween.

Further, the R light receiving cells, the G light receiving cells, and the B light receiving cells are respectively positioned to be symmetric to each other with respect to the central light receiving cell (center) of each unit block. Thereby, by using output signals of the RGB light receiving cells in the unit blocks, after the demosaic processing (synchronization processing) of each unit block, one pixel (a pixel value of RGB) constituting an image can be generated.

That is, by obtaining an average value of the output signals (pixel values) of the four G light receiving cells within the unit block, it is possible to acquire a pixel value of the G pixel at the center of the unit block (single micro lens). Likewise, by obtaining an average value of the pixel values of the two R light receiving cells and an average value of the pixel values of the two B light receiving cells within the unit block, it is possible to acquire respective pixel values of the R and B pixels at the center of the unit block.

Thereby, the telephoto image, which is generated by a group of the peripheral eight light receiving cells of each unit block and corresponds to the annular optical system 14 (telephoto optical system), can be subjected to demosaic processing on the basis of pixel values of the RGB light receiving cells within the unit block. Thus, by interpolating the pixel values of the light receiving cells of the peripheral unit blocks, it is not necessary to generate pixel values of pixels in a specific wavelength region, and there is no deterioration in resolution (substantial number of pixels).

<Internal Configuration of Auto-Tracking Imaging Apparatus>

Figure 5:
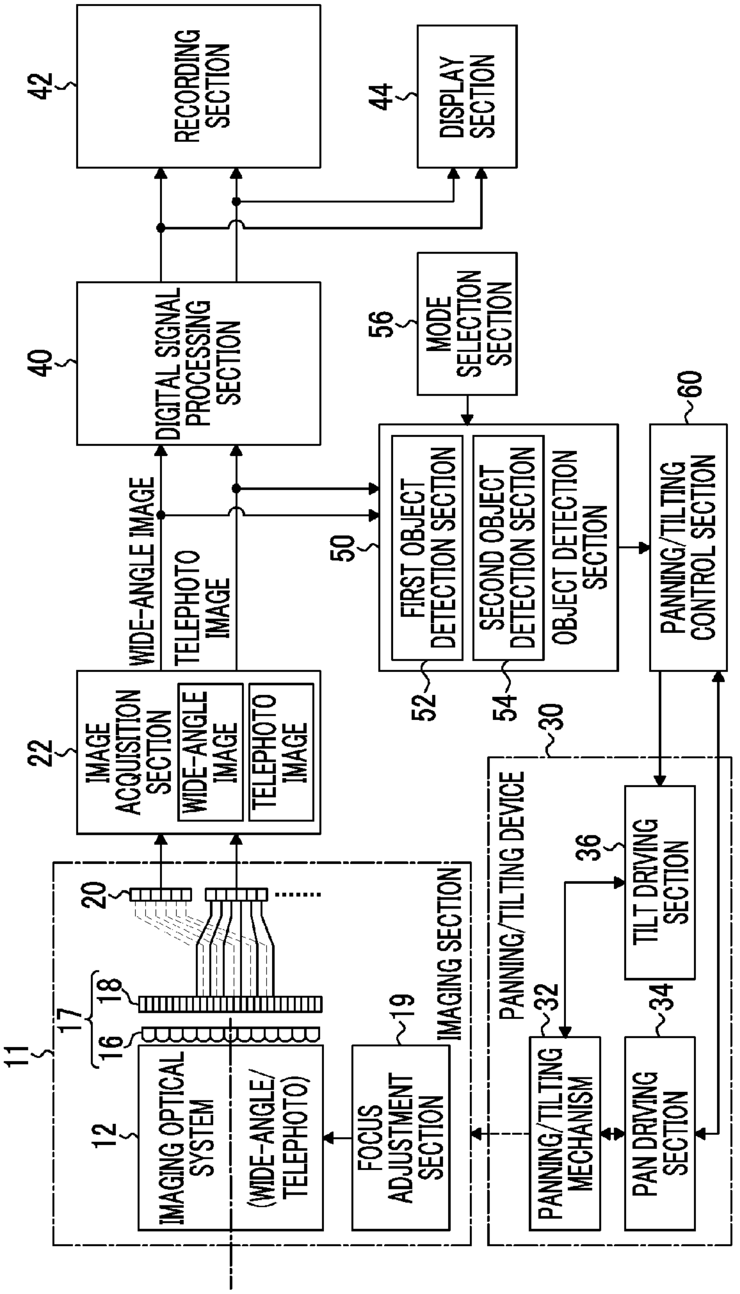
FIG. 5 is a block diagram illustrating an embodiment of an internal configuration of the auto-tracking imaging apparatus.

FIG. 5 is a block diagram illustrating an embodiment of an internal configuration of the auto-tracking imaging apparatus 10.

As shown in FIG. 5, the auto-tracking imaging apparatus 10 comprises the imaging section 11 that is formed of the imaging optical system 12, which has the central optical system 13 and the annular optical system 14 described in FIG. 2 and the directional sensor 17 which has the micro lens array 16 and the image sensor 18 described in FIGS. 3 and 4A to 4C2.

It is preferable that the imaging section 11 comprises a focus adjustment section 19 that performs focus adjustment of the telephoto optical system (annular optical system 14). The focus adjustment section 19 can be constituted of, for example, a voice coil motor that moves an entire or partial optical system of the annular optical system 14 in the optical axis direction, and the like. Further, determination as to whether or not the telephoto image is in an in-focus state can be performed on the basis of a contrast of a focus detection region of the telephoto image. However, the focus adjustment method is not limited to this. In addition, in the wide-angle optical system (central optical system 13), the focus adjustment section may be separately provided, and the panning and focusing function may be used.

The panning/tilting device (electric pan head) 30 comprises, as shown in FIG. 1, a panning mechanism that rotates the imaging section 11 in the horizontal direction (panning direction) of the apparatus main body 2, and a panning/tilting mechanism (hereinafter referred to as a "panning/tilting mechanism") 32 that rotates the imaging section 11 in the vertical direction (tilting direction), a pan driving section 34, a tilt driving section 36, and the like. The panning/tilting mechanism 32 has a home position sensor that detects a reference position of a rotation angle (pan angle) in the panning direction and a home position sensor that detects a reference position of an inclination angle (tilt angle) in the tilting direction.

Each of the pan driving section 34 and the tilt driving section 36 has a stepping motor and a motor driver, outputs a driving force to a panning/tilting mechanism 32, and drives the panning/tilting mechanism 32.

The imaging section 11 captures time-series wide-angle and telephoto images through the imaging optical system 12 and the directional sensor 17, and converts subject images into signal voltages (or electric charges) of which amounts correspond to an amount of incident light. The subject images are formed on light receiving surfaces of the light receiving cells (photoelectric conversion elements) of the directional sensor 17 (image sensor 18) through the imaging optical system 12.

The signal voltages (or electric charges) accumulated in the image sensor 18 can be stored in the light receiving cells themselves or provided capacitors. The stored signal voltages (or electric charges) are read in conjunction with selection of positions of the light receiving cells by a method of using MOS-type imaging elements (so-called CMOS sensors) based on an X-Y address system.

Thereby, pixel signals, which indicate wide-angle images of groups of the central light receiving cells corresponding to the central optical system 13, and pixel signals, which indicate telephoto images of groups of the eight peripheral light receiving cells corresponding to the annular optical system 14, can be read from the image sensor 18. In addition, pixel signals, which indicate the wide-angle and telephoto images, are continuously read from the image sensor 18, at a predetermined frame rate (for example, a frame number per sec. of 24 p, 30 p, or 60 p).

The pixel signal (voltage signals), which is read from the image sensor 18, for each light receiving cell is sampled through correlated double sampling processing (processing of acquiring precise pixel data by taking a difference between a feed-through component level and a signal component level included in the output signal of each light receiving cell in order to reduce noise (particularly thermal noise) included in the sensor output signal). Then, the signal is amplified, and thereafter added to an A/D converter 20. The A/D converter 20 converts the pixel signals, which are sequentially input, into digital signals, and outputs the signals to the image acquisition section 22. In addition, the A/D converter may be built into the MOS-type sensor. In this case, the digital signals are output directly from the image sensor 18.

The image acquisition section 22 selects the positions of the light receiving cells of the image sensor 18 and reads the pixel signals, thereby simultaneously or selectively acquiring the pixel signals, which indicate the wide-angle image, and the pixel signals which indicate the telephoto image.

That is, by selectively reading the pixel signals of the light receiving cells of the image sensor 18 onto which the central pupil images 17*a* are incident, it is possible to acquire the pixel signals (pixel signals indicating mosaic images having a Bayer array) indicating a wide-angle image of the light receiving cells (each of which is the central light receiving cell of the 3×3 light receiving cells) each of which corresponds to each one micro lens. In contrast, by selectively reading the pixel signals of the light receiving cells of the image sensor 18 onto which the annular pupil images 17*b* are incident, it is possible to acquire the pixel signals (pixel signals indicating mosaic images having a Bayer array) indicating a telephoto image of the light receiving cells (which are the peripheral light receiving cells of the 3×3 light receiving cells) of which every eight light receiving cells correspond to each one micro lens.

In addition, all the pixel signals may be read from the image sensor 18 and temporarily stored in the buffer memory, and groups of the pixel signals of the two images of the wide-angle and telephoto images may be divided from the pixel signals stored in the buffer memory.

The pixel signals, which indicate the wide-angle and telephoto images acquired by the image acquisition section 22, are respectively output to a digital signal processing section 40 and an object detection section 50.

The digital signal processing section 40 performs predetermined signal processing, such as offset processing, gamma correction processing, and demosaic processing for the signals of the RGB mosaic images, on the input digital pixel signals (sequential R, G, and B signals of RGB points). Here, the demosaic processing is processing of calculating information of all colors for each pixel from the RGB mosaic images corresponding to a color filter array of a single-plate-type image sensor 18, and is also referred to as synchronization processing. For example, in the case of the image sensor 18 having color filters of three colors of RGB, the demosaic processing is processing of calculating information of all colors of RGB for each pixel from the mosaic images having RGB colors.

That is, the demosaic processing section included in the digital signal processing section 40 does not have the R and B light receiving cells at the positions of the G light receiving cells of the wide-angle image (mosaic images having a Bayer array). Hence, the R and B signals of the R and B light receiving cells around the G light receiving cells are separately interpolated, and the R and B signals at the positions of the G light receiving cells are generated. Likewise, at the positions of the R light receiving cells of the mosaic images, there are no G and B light receiving cells. Hence, the G and B signals of the G and B light receiving cells around the R light receiving cells are separately interpolated, and the G and B signals at the positions of the R light receiving cells are generated. Further, at the positions of the B light receiving cells of the mosaic images, there are no G and R light receiving cells. Hence, the G and R signals of the G and R light receiving cells around the B light receiving cells are separately interpolated, and the G and R signals at the positions of the B light receiving cells are generated.

In contrast, as shown in FIG. 4C2, the telephoto image is formed of the mosaic images of which every eight (eight peripheral blocks of 3×3 unit blocks) images correspond to one micro lens 16*a*, and the eight light receiving cells include all RGB color information pieces (of the R, G and B light receiving cells). Accordingly, the demosaic processing section is able to generate a single pixel (RGB pixel value) constituting the image, on which the demosaic processing is performed, for each unit block, by using the output signals of the eight light receiving cells in the unit block.

Specifically, the demosaic processing section, which performs the demosaic processing on the mosaic images of the telephoto image, calculates an average value of the pixel values of the four G light receiving cells in the unit block, thereby calculating a G pixel value of the pixel at the center position of the unit block (single micro lens). Likewise, the demosaic processing section calculates an average value of the pixel values of the two R light receiving cells and an average value of the pixel values of the two B light receiving cells in the unit block, thereby calculating R and B pixel values of the pixels at the center positions of the respective unit blocks.

The demosaic image of the telephoto image of two demosaic images of the wide-angle and telephoto images generated by the demosaic processing section is subjected to demosaic processing by using the output signals of the eight light receiving cells in the unit block. Accordingly, the resolution of the demosaic image is substantially higher than that of the demosaic image of the wide-angle image which is subjected to demosaic processing by using (interpolating) the output signals of the light receiving cells of the peripheral unit blocks.

Further, the digital signal processing section 40 performs RGB/YC conversion or the like which generates a luminance signal Y and color difference signals Cb and Cr from the RGB color information pieces (R, G, and B signals) on which demosaic processing is performed by the demosaic processing section, thereby generating image signals for recording and displaying a moving image indicating the wide-angle and telephoto images with the predetermined frame rate.

The image signals, which indicate the wide-angle and telephoto images processed by the digital signal processing section 40, are respectively output to the recording section 42 and the display section 44. The recording section 42 records the image signals for recording a moving image indicating the wide-angle and telephoto images processed by the digital signal processing section 40 in a recording medium (such as a hard disk or a memory card). In addition, the recording section 42 may record only the telephoto image.

The display section 44 displays the wide-angle and telephoto images on the basis of the image signals for displaying the moving image indicating the wide-angle and telephoto images processed by the digital signal processing section 40. In addition, the display section 44 may reproduce the wide-angle and telephoto images on the basis of the image signals recorded in the recording section 42.

In contrast, the object detection section 50 has: a first object detection section 52 that detects a tracking target object on the basis of the pixel signals indicating the wide-angle and telephoto images acquired by the image acquisition section 22, outputs the information about the position of the detected object in the image to the panning/tilting control section 60, detects the object on the basis of the telephoto image, and detects the information about the position of the object in the telephoto image; and a second object detection section 54 that detects the object on the basis of the wide-angle image, and detects the information about the position of the object in the wide-angle image.

As the object detection method in the first object detection section 52 and second object detection section 54, there is a method of detecting a specific object on the basis of an object recognition technology as a representative of a technology for recognizing a person's face, or a moving object detection method of detecting a moving object as a tracking target object.

The object detection method based on object recognition is a method in which features of a specific object in a viewing direction are registered as an object dictionary in advance and an object is recognized by comparing the object dictionary with a clipped image while changing a position or a size of the object from the captured image.

Figures 6A, 6B:
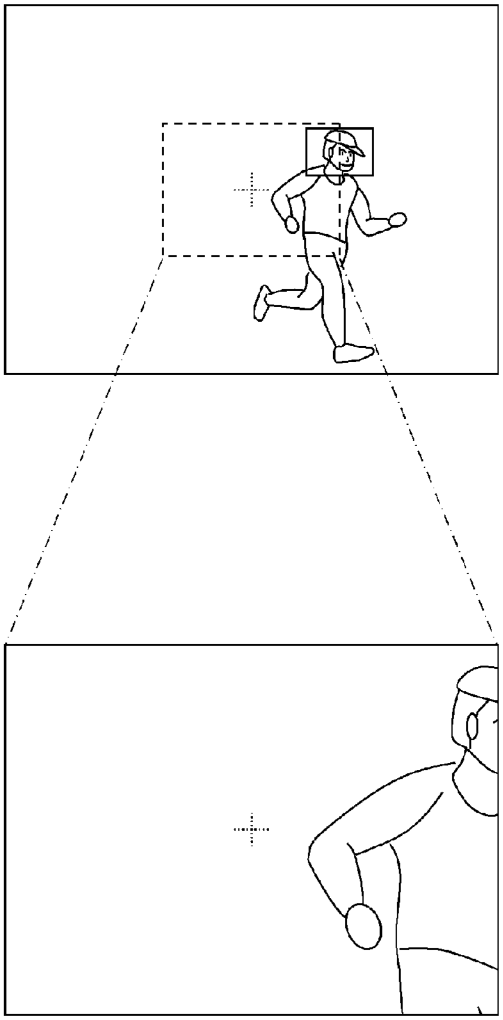
FIGS. 6A and 6B are diagrams illustrating examples of the wide-angle and telephoto images captured by the auto-tracking imaging apparatus.

FIGS. 6A and 6B are diagrams respectively illustrating examples of captured wide-angle and telephoto images. In addition, the region indicated by the dashed line within the wide-angle image represents an imaging range of the telephoto image.

At this time, the wide-angle and telephoto images shown in FIGS. 6A and 6B are captured, a person's face is set as a tracking target, and the person's face is detected by using an object (face) recognition technology. In this case, the second object detection section 54 is able to detect the face, but the first object detection section 52 is unable to detect the face. The reason for this is that telephoto image includes only a part of the person's face, and thus face cannot be recognized.

Accordingly, in this case, the second object detection section 54 outputs information about a position of the detected person's face (object) in the wide-angle image to the panning/tilting control section 60.

In contrast, in a case where the first object detection section 52 detects the object on the basis of the telephoto image, the first object detection section 52 outputs information about a position of the detected object in the telephoto image to the panning/tilting control section 60 in priority to the information about the position of the object, which is detected by the second object detection section 54, in the wide-angle image. The reason for this is that the first object detection section 52 has a higher accuracy in detecting the position of the object than the second object detection section 54.

Further, in the present example, a mode selection section 56, which selects a first tracking mode or a second tracking mode, is provided. The first tracking mode is a mode for outputting only the information about the position of the object detected by the second object detection section 54 in the wide-angle image to the panning/tilting control section 60 and controlling the panning/tilting device 30 on the basis of the information about the position in the wide-angle image. On the other hand, the second tracking mode is a mode that uses the first object detection section 52 and the second object detection section 54 in combination. In the mode, in a case where the first object detection section 52 detects the object, the information about the position of the object in the telephoto image is preferentially output to the panning/tilting control section 60, and the panning/tilting device 30 is controlled on the basis of the information about the position in the telephoto image. In a case where the first object detection section 52 does not detect the object, the information about the position of the object detected by the second object detection section 54 in the wide-angle image is output to the panning/tilting control section 60, and the panning/tilting device 30 is controlled on the basis of the information about the position of the object in the wide-angle image.

The panning/tilting control section 60 is a section that controls the panning/tilting device 30 on the basis of the information about the position of the object in the image (in the wide-angle image or the telephoto image) which is input from the object detection section 50 as described above. The panning/tilting control section 60 controls the panning/tilting mechanism 32 (that is, a direction of imaging performed by the imaging section 11) through the pan driving section 34 and the tilt driving section 36 such that the position (for example, a barycentric position of a face region in a case where the tracking target is a face) of the object in the image is moved to the center position (a position on the optical axis) in the image.

Figure 7:
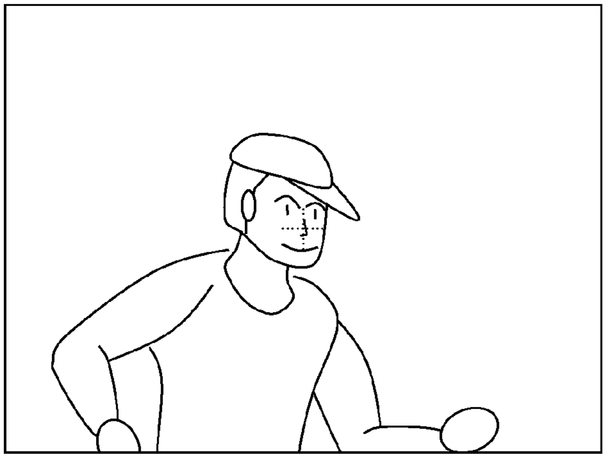
FIG. 7 is an image diagram illustrating a telephoto image that indicates a state where tracking is controlled such that a specific object (a face of a person) is at the center of the telephoto image.

Under the control of the panning/tilting mechanism 32, it is possible to capture an image while automatically tracking a tracking target object (for example, person's face) such that the object is at the centers of the wide-angle and telephoto images. FIG. 7 shows a telephoto image that indicates a state where tracking is controlled such that a specific object (a face of a person) is at the center of the telephoto image. In the present example, the case of controlling tracking such that the position (barycentric position) of the object in the image is at the center of the telephoto image has been described, but the present invention is not limited to this. Thus, the panning/tilting mechanism 32 may be controlled such that the position (barycentric position) of the object in the image is set in at least an angle of view of the telephoto image (preferably, set in a predetermined range (for example, in a focus detection region) in the vicinity of the center of the telephoto image).

Next, as the object detection method of the first object detection section 52 and second object detection section 54, an example of a moving object detection method of detecting a moving object as a tracking target object will be described.

Figure 8A:
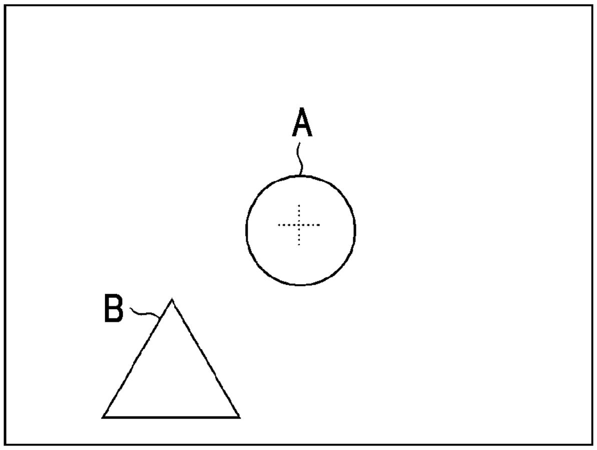
FIGS. 8A to 8C are diagrams illustrating an example of a moving object detection method for detecting a moving object as a tracking target object.
Figure 8B:
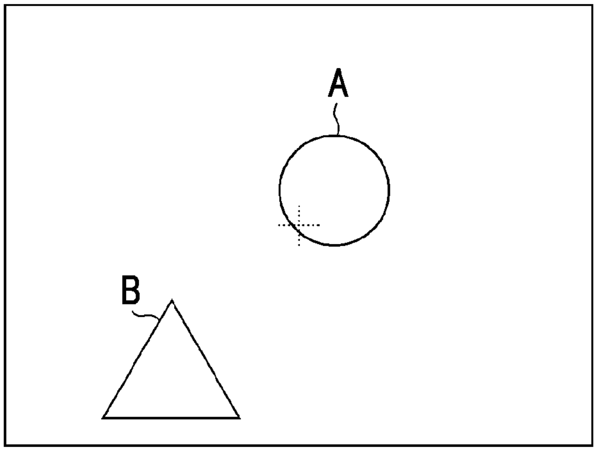
Figure 8C:
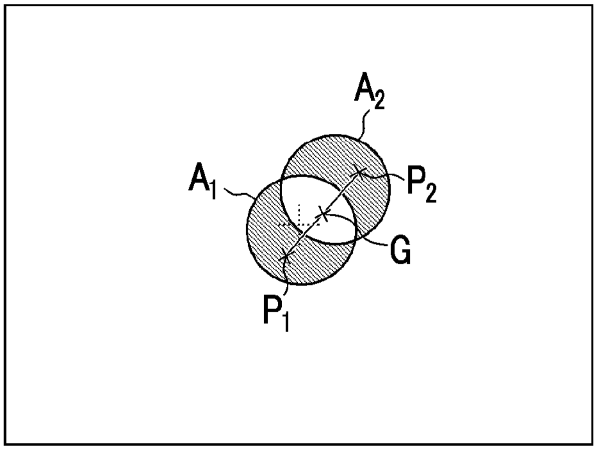

In this case, as shown in FIGS. 8A to 8C, the first object detection section 52 detects a difference image (FIG. 8C) which is obtained from a difference between two time-series telephoto images (a previously acquired telephoto image (FIG. 8A) and a currently acquired telephoto image (FIG. 8B).

In the examples shown in FIGS. 8A and 8B, the object A of the objects A and B moves, and the object B remains stationary.

Accordingly, as shown in FIG. 8C, the difference images $A_1$ and $A_2$ are images generated through movement of the object A.

Here, the barycentric positions of the difference images $A_1$ and $A_2$ are calculated, and respectively referred to as positions $P_1$ and $P_2$, and the midpoint of a line segment connecting these positions $P_1$ and $P_2$ is referred to as a position G. In addition, the position G is set as a position of the moving object (object A) in the telephoto image.

The panning/tilting mechanism 32 (that is, the direction of imaging performed by the imaging section 11) is repeatedly controlled such that the position G of the object A in the telephoto image calculated in such a manner is moved to the center position (the position on the optical axis) in the telephoto image. Thereby, the object A is moved (converged) to the center position in the telephoto image.

In addition, in a manner similar to that of the first object detection section 52, the second object detection section 54 is also able to detect the position of the object in the wide-angle image by detecting the tracking target object (moving object) on the basis of the wide-angle image. Further, in a case where the imaging section 11 is moved (moved by the panning/tilting mechanism 32, or moved since the auto-tracking imaging apparatus 10 is mounted on a vehicle), background also moves between time-series images. However, in this case, by shifting the images such that backgrounds between the time-series images coincide with each other and acquiring the difference image between the shifted images, regardless of movement of the imaging section 11, it is possible to detect the object which moves in real space. Furthermore, the moving object detection method is not limited to the embodiments.

<Auto-Tracking Control Method>

Figure 9:
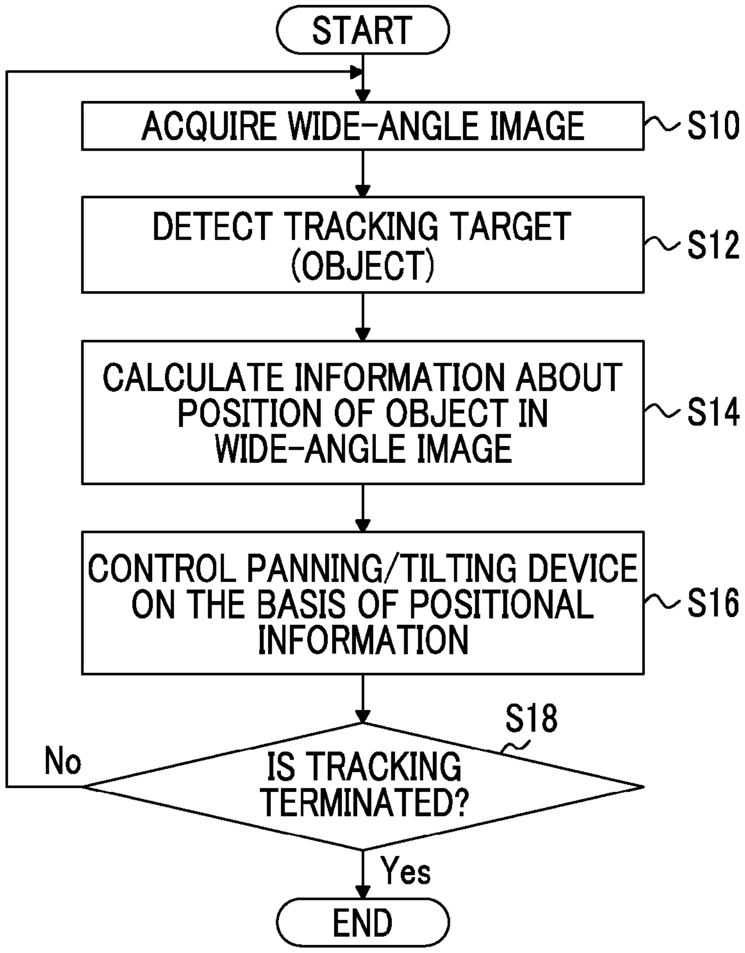
FIG. 9 is a flowchart illustrating an example of an auto-tracking control method using the auto-tracking imaging apparatus according to the present invention.

FIG. 9 is a flowchart illustrating an example of the auto-tracking control method in the auto-tracking imaging apparatus according to the present invention, and shows a case where the mode selection section 56 selects the first tracking mode.

In FIG. 9, the second object detection section 54 acquires the wide-angle image from the image acquisition section 22 (step S10), and detects the tracking target object from the acquired wide-angle image (step S12).

Subsequently, the second object detection section 54 calculates the information about the position of the detected object in the wide-angle image (step S14).

Next, the panning/tilting control section 60 inputs the information about the position of the object in the wide-angle image from the second object detection section 54, and controls the panning/tilting device 30 such that the object is at the center of the wide-angle image on the basis of the input positional information (step S16).

Next, it is determined whether or not the auto-tracking imaging is terminated (step S18). If it is determined that the imaging is not terminated, the process advances to step S10. Thereby, the processes of steps S10 to S18 are repeated, and the object is automatically tracked and imaged. In contrast, if it is determined that the auto-tracking imaging is terminated, the auto-tracking imaging is terminated. In addition, determination as to whether or not the auto-tracking imaging is terminated may be performed by turning on/off a power supply, and may be performed on the basis of a switch input indicating whether or not the auto-tracking imaging is performed.

Figure 10:
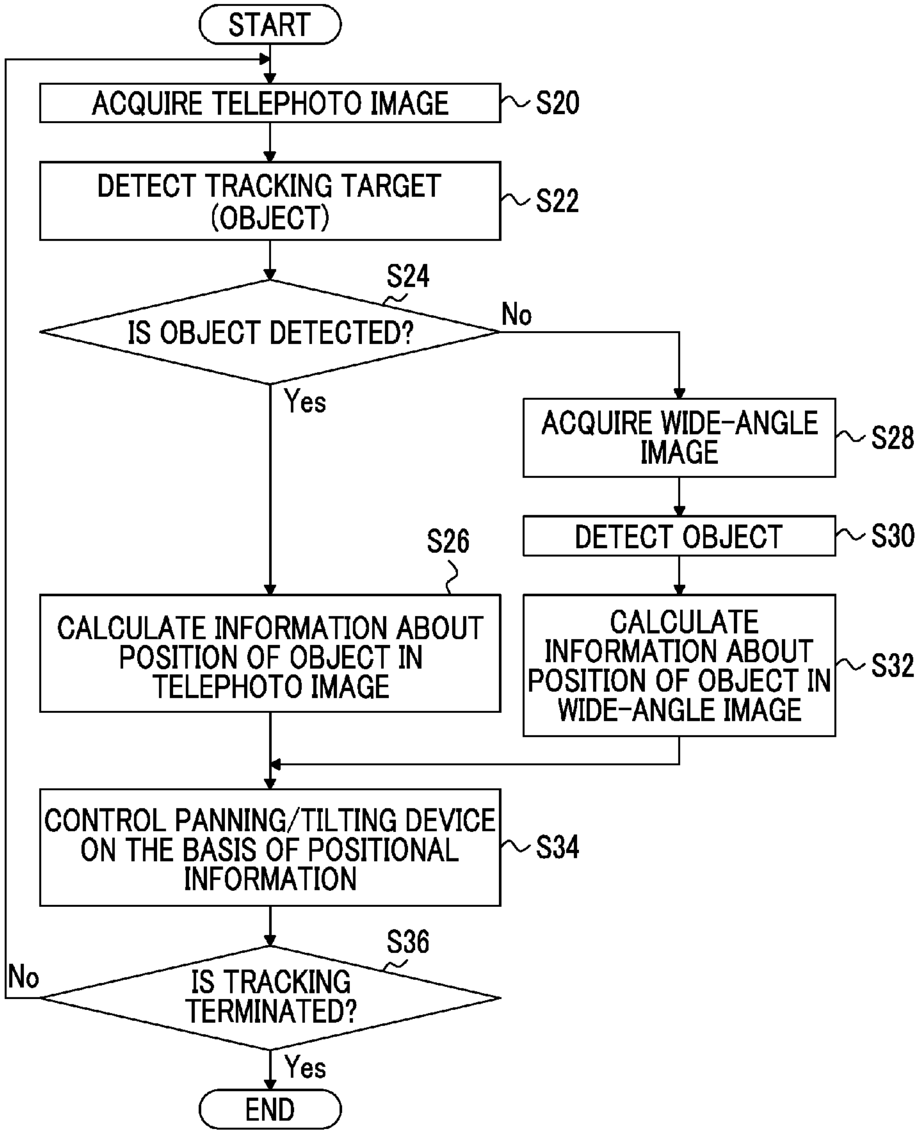
FIG. 10 is a flowchart illustrating another example of the auto-tracking control method using the auto-tracking imaging apparatus according to the present invention.

FIG. 10 is a flowchart illustrating another example of the auto-tracking control method in the auto-tracking imaging apparatus according to the present invention, and shows a case where the mode selection section 56 selects the second tracking mode.

In FIG. 10, the first object detection section 52 acquires the telephoto image from the image acquisition section 22 (step S20), and detects the tracking target object from the acquired telephoto image (step S22).

Subsequently, it is determined whether the first object detection section 52 detect the object, in step S22 (step S24). In a case where the object is detected (in a case of "Yes"), the first object detection section 52 calculates the information about the position of the detected object in the telephoto image (step S26).

In contrast, in a case where the object is not detected (in a case of "No"), the process advances to step S28, and the second object detection section 54 performs processing of steps S28 to S32. Here, the processing of steps S28 to S32 is the same as processing of steps S10 to S14 shown in FIG. 9. That is, the second object detection section 54 acquires the wide-angle image from the image acquisition section 22 (step S28), detects the tracking target object from the acquired wide-angle image (step S30), and calculates the information about the position of the detected object in the wide-angle image (step S32).

Next, the panning/tilting control section 60 inputs the information about the position of the object detected in step S26 in the telephoto image or the information about the position of the object detected in step S32 in the wide-angle image, and controls the panning/tilting device 30 such that the object is at the center position in the telephoto image or at the center position in the wide-angle image, on the basis of the input positional information (step S34). In addition, it is needless to say that, in the control of the panning/tilting device 30 performed by the panning/tilting control section 60, in a case where the first object detection section 52 detects the object on the basis of the telephoto image, the control of the panning/tilting device 30 is prioritized on the basis of the information about the position of the object in the telephoto image.

Next, it is determined whether or not the auto-tracking imaging is terminated (step S36). If it is determined that the imaging is not terminated, the current process advances to step S20. Thereby, the processes of steps S20 to S36 are repeated, and the object is automatically tracked and imaged. In contrast, if it is determined that the auto-tracking imaging is terminated, the auto-tracking imaging is terminated.

Another Embodiment of Directional Sensor

Figure 11:
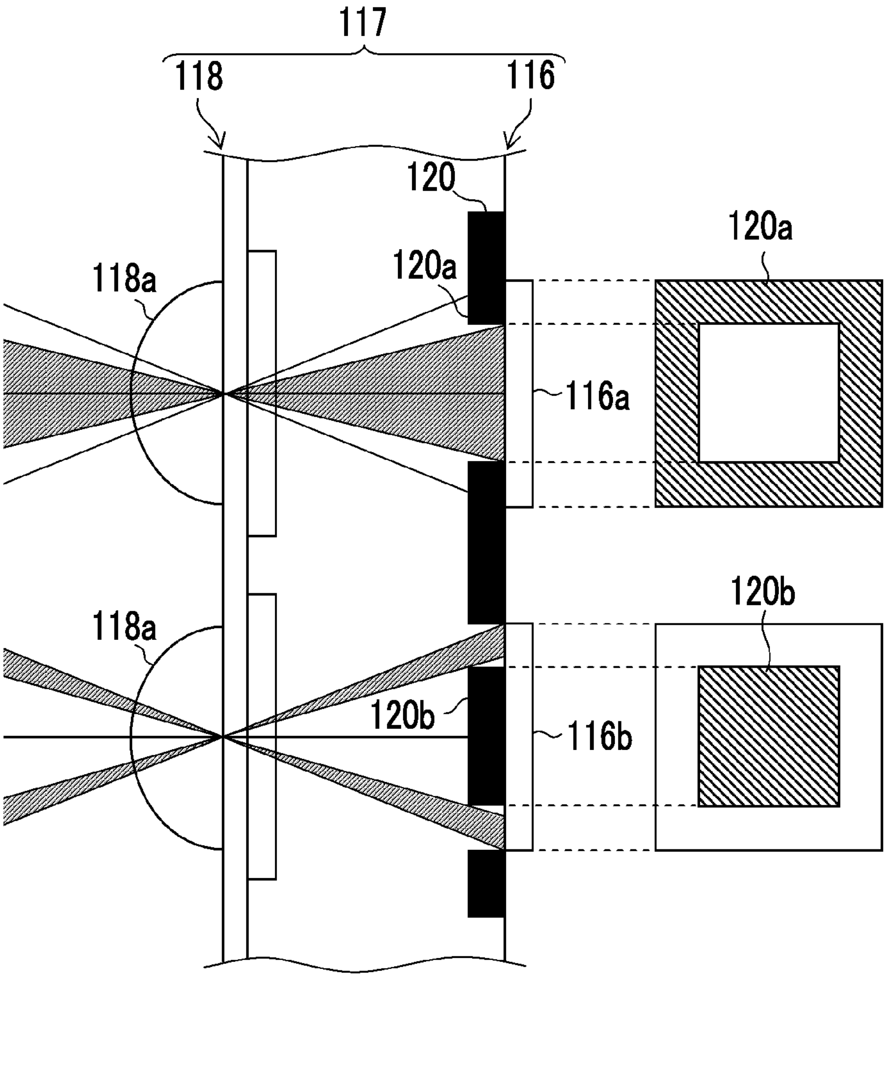
FIG. 11 is a side view illustrating another embodiment of a directional sensor.

FIG. 11 is a side view illustrating another embodiment of the directional sensor.

A directional sensor 117 includes a micro lens array 118 as pupil division means, a light blocking member 120 that functions as a light blocking mask, and an image sensor 116 in which the light receiving cells 116*a* and 116*b* are partially blocked by the light blocking member 120. In addition, the light receiving cells 116*a* and 116*b*, which are partially blocked by the light blocking member 120, are provided alternately (in a checker flag shape) in the left-right direction and up-down direction of the image sensor 116.

The micro lens array 118 has micro lenses 118*a* corresponding one-to-one with the light receiving cells 116*a* and 116*b* of the image sensor 116.

The light blocking member 120 is configured to regulate the openings of the light receiving cells 116*a* and 116*b* of the image sensor 116, and the openings have opening shapes corresponding to the central optical system 13 and annular optical system 14 of the imaging optical system 12 shown in FIG. 2. In addition, color filters of red (R), green (G), and blue (B) are arranged under the lenses of the micro lens array 118.

The circumferential portion of the opening of the light receiving cell 116*a* is shielded from light by the light blocking section 120*a* of the light blocking member 120, while the central portion of the opening of the light receiving cell 116*b* is shielded from light by the light blocking section 120*b* of the light blocking member 120. Thereby, rays passing through the central optical system 13 of the imaging optical system 12 are pupil-divided by the light blocking section 120*a* of the light blocking member 120 and the micro lens array 118, and are incident onto the light receiving cell 116*a*, while rays passing through the annular optical system 14 of the imaging optical system 12 are pupil-divided by the light blocking section 120*b* of the light blocking member 120 and the micro lens array 118, and are incident onto the light receiving cell 116*b*.

Thereby, a pixel signal of the wide-angle image can be read from the each light receiving cell 116*a* of the image sensor 116, and a pixel signal of the telephoto image can be read from each light receiving cell 116*b* of the image sensor 116.

Another Embodiment of Imaging Section

Next, another embodiment of the imaging section applied to the auto-tracking imaging apparatus according to the present invention will be described.

Figure 12:
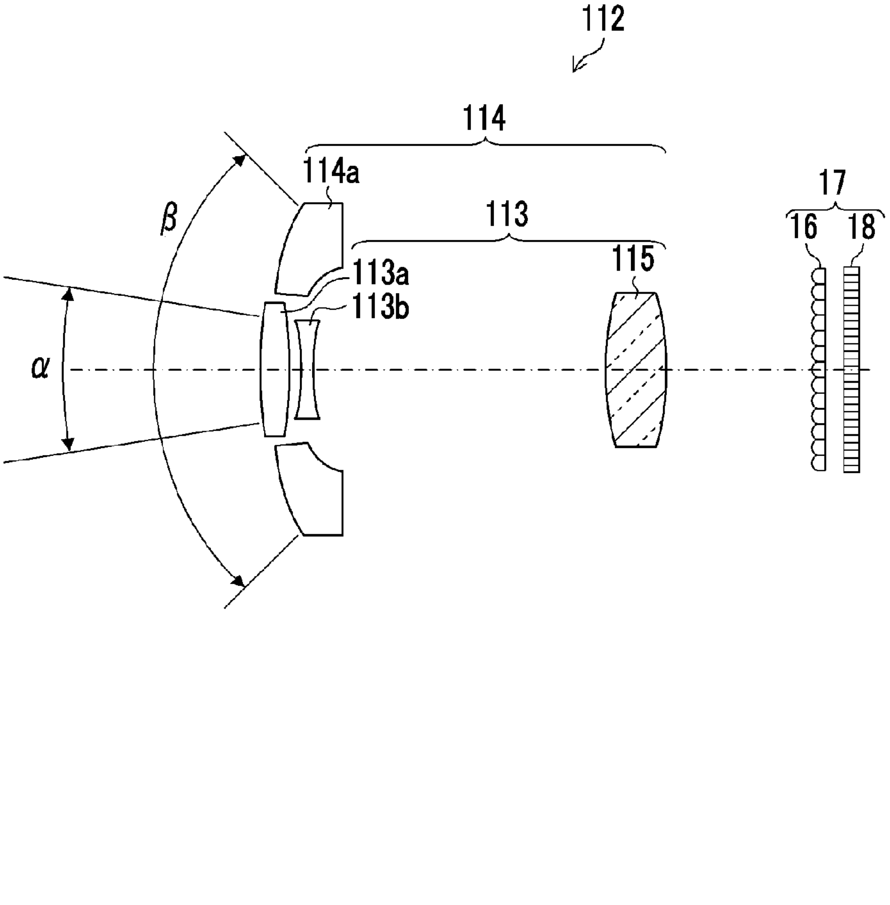
FIG. 12 is a sectional view illustrating another embodiment of the imaging section that can be applied to the auto-tracking imaging apparatus.

FIG. 12 is a sectional view illustrating another embodiment of the imaging section that can be applied to the auto-tracking imaging apparatus 10.

The imaging section includes an imaging optical system 112 and the directional sensor 17. In addition, the directional sensor 17 is the same as those shown in FIGS. 2 and 3, and hereinafter the imaging optical system 112 will be described.

The imaging optical system 112 is formed of a central optical system 113 at the central portion and an annular optical system 114 at the periphery. The systems are disposed on the same optical axis.

The central optical system 113 is a telephoto optical system formed of a first lens 113*a*, a second lens 113*b*, and a common lens 115, and has an angle of view $\alpha$.

The annular optical system 114 is a wide-angle optical system formed of a lens 114*a* and a common lens 115, and has angle of view $\beta$ ($\beta>\alpha$), and the angle of view $\beta$ is greater than that of the central optical system 113.

As compared with the imaging optical system 12 shown in FIG. 2, the imaging optical system 112 is different in that the system does not use a reflection mirror, the central optical system 113 is a telephoto optical system, and the annular optical system 114 is a wide-angle optical system.

[Others]

In the auto-tracking imaging apparatus 10 of the present embodiment, the panning/tilting mechanism 32, which rotates the imaging section 11 in the panning direction and the tilting direction, is provided in the apparatus main body 2. However, the present invention is not limited to this, and the entire imaging apparatus may be mounted on an electric pan head (panning/tilting device). In addition, the auto-tracking imaging apparatus according to the present invention can be used as, for example, a surveillance camera, or an on-board camera.

Further, the tracking target object may be initially set by an operator using a touch panel or the like on the basis of the wide-angle image which is displayed on the display section 44.

In the imaging optical system of the present embodiment, the second optical system provided at the periphery of the first optical system is the annular optical system. However, the present invention is not limited to this, and the second optical system may be formed of a plurality of optical systems arranged concentrically around the optical axis.

The reflection mirror in the reflection-mirror-type lens configuration of the imaging optical system 12 shown in FIG. 2 is not limited to a concave mirror or a convex mirror, and may be a plane mirror. Further, the number of reflection mirrors is not limited to two, and may be equal to or greater than three.

Further, the focus adjustment section may move the common lens or the image sensor of the central optical system and the annular optical system in the optical axis direction.

Furthermore, it is apparent that the present invention is not limited to the above-mentioned embodiments, and may be modified into various forms without departing from the scope of the present invention.

EXPLANATION OF REFERENCES

10: auto-tracking imaging apparatus
11: imaging section
12, 112: imaging optical system
13, 113: central optical system
14, 114: annular optical system
16, 118: micro lens array
16*a*, 118*a*: micro lens
17, 117: directional sensor
18, 116: image sensor
18*a*, 116*a*, 116*b*: light receiving cell
22: image acquisition section
30: panning/tilting device
32: panning/tilting mechanism
42: recording section
50: object detection section
52: first object detection section
54: second object detection section
56: mode selection section
60: panning/tilting control section
120: light blocking member

What is claimed is:

1. An auto-tracking imaging apparatus comprising:

an imaging optical system that is formed of a first optical system at a central portion thereof and a second optical system which is provided at the periphery of the first optical system and has an optical axis the same as that of the first optical system, where one of the optical systems is a wide-angle optical system, and the other is a telephoto optical system;

a directional sensor that has a plurality of pixels constituted of photoelectric conversion elements two-dimensionally arranged and a micro lens array or a light blocking mask, wherein the micro lens array or the light blocking mask pupil-divides rays incident through the wide-angle and telephoto optical systems such that the plurality of pixels selectively receive the rays;

a panning/tilting mechanism that rotates an imaging section, which includes the imaging optical system and the directional sensor, in horizontal and vertical directions;

an image acquisition section that respectively acquires a wide-angle image, for which light is received from the directional sensor through the wide-angle optical system, and a telephoto image for which light is received from the directional sensor through the telephoto optical system;

an object detection section that detects a tracking target object on the basis of at least the wide-angle image in the wide-angle and telephoto images acquired by the image acquisition section; and a panning/tilting control section that controls the panning/tilting mechanism on the basis of information about a position of the object, which is detected by the object detection section, in the image.

2. The auto-tracking imaging apparatus according to claim 1, further comprising a recording section that records at least the telephoto image in the wide-angle and telephoto images acquired by the image acquisition section.

3. The auto-tracking imaging apparatus according to claim 1, wherein the object detection section detects a moving object on the basis of at least the wide-angle image in the wide-angle and telephoto images continuously acquired by the image acquisition section, and sets the detected moving object as the tracking target object.

4. The auto-tracking imaging apparatus according to claim 1, wherein the object detection section recognizes a specific object on the basis of at least the wide-angle image in the wide-angle and telephoto images acquired by the image acquisition section, and sets the recognized specific object as the tracking target object.

5. The auto-tracking imaging apparatus according to claim 1, wherein the panning/tilting control section controls the panning/tilting mechanism on the basis of the information about the position of the object, which is detected by the object detection section, in the image, and wherein an angle of view of at least the telephoto image is set to include the detected object.

6. The auto-tracking imaging apparatus according to claim 1, wherein the object detection section has a first object detection section that detects the object on the basis of the telephoto image acquired by the image acquisition section, and a second object detection section that detects the object on the basis of the wide-angle image acquired by the image acquisition section, and wherein the panning/tilting control section controls the panning/tilting mechanism on the basis of the information about a position of the object, which is detected by the first object detection section, in the telephoto image, and controls the panning/tilting mechanism on the basis of the information about a position of the object, which is detected by the second object detection section, in the wide-angle image when the first object detection section is unable to detect the object.

7. The auto-tracking imaging apparatus according to claim 6, further comprising a mode selection section that selects a first tracking mode or a second tracking mode, wherein the panning/tilting control section controls the panning/tilting mechanism on the basis of only the information about the position of the object, which is detected by the second object detection section, in the wide-angle image if the mode selection section selects the first tracking mode, controls the panning/tilting mechanism on the basis of the information about the position of the object, which is detected by the first object detection section, in the telephoto image if the mode selection section selects the second tracking mode, and controls the panning/tilting mechanism on the basis of the information about the position of the object, which is detected by the second object detection section, in the wide-angle image when the first object detection section is unable to detect the object.

8. The auto-tracking imaging apparatus according to claim 1, wherein the first optical system of the imaging optical system is a central optical system that has a circular shape, and the second optical system is an annular optical system that is disposed concentrically around the central optical system.

9. The auto-tracking imaging apparatus according to claim 8, wherein the annular optical system has a reflective optical system that reflects rays twice or more.

10. The auto-tracking imaging apparatus according to claim 1, wherein the first optical system is the wide-angle optical system, and the second optical system is the telephoto optical system.

11. The auto-tracking imaging apparatus according to claim 1, further comprising a focus adjustment section that performs focus adjustment of the telephoto optical system.

12. The auto-tracking imaging apparatus according to claim 1, wherein the imaging section further comprises an analog-to-digital converter configured to convert signals from the directional sensor into digital signals and configured to output the digital signals to the image acquisition section.

13. The auto-tracking imaging apparatus according to claim 1, further comprising a digital signal processing section that performs signal processing of digital signals received from the image acquisition section.

14. An auto-tracking imaging apparatus comprising:

an imaging optical system that is formed of a first optical system at a central portion thereof and a second optical system which is provided at the periphery of the first optical system and has an optical axis the same as that of the first optical system, where one of the optical systems is a wide-angle optical system, and the other is a telephoto optical system;

a directional sensor that has a plurality of pixels constituted of photoelectric conversion elements two-dimensionally arranged and a micro lens array or a light blocking mask, wherein the micro lens array or the light blocking mask pupil-divides rays incident through the wide-angle and telephoto optical systems such that the plurality of pixels selectively receive the rays;

a panning/tilting mechanism that rotates an imaging section, which includes the imaging optical system and the directional sensor, in horizontal and vertical directions;

an image acquisition section that respectively acquires a wide-angle image, for which light is received from the directional sensor through the wide-angle optical system, and a telephoto image for which light is received from the directional sensor through the telephoto optical system;

an object detection section that detects a tracking target object on the basis of at least the wide-angle image in the wide-angle and telephoto images acquired by the image acquisition section;

a panning/tilting control section that controls the panning/tilting mechanism on the basis of information about a position of the object, which is detected by the object detection section, in the image; and a digital signal processing section that performs signal processing of digital signals received from the image acquisition section, wherein the imaging section is configured to send digital signals to the image acquisition section, wherein the image acquisition section is configured to receive digital signals from the imaging section, wherein the image acquisition section is configured to send digital signals to the digital signal processing section, wherein the image acquisition section is configured to send digital signals to the object detection section, wherein the digital signal processing section is configured to receive digital signals from the image acquisition section, wherein the object detection section is configured to receive digital signals from the image acquisition section, wherein the object detection section is configured to send digital signals to the panning/tilting control section, wherein the panning/tilting control section is configured to receive digital signals from the object detection section, wherein the panning/tilting control section is configured to send digital signals to the panning/tilting mechanism, and wherein the panning/tilting mechanism is configured to receive digital signals from the panning/tilting control section.

15. The auto-tracking imaging apparatus according to claim 14, wherein the imaging section further comprises an analog-to-digital converter configured to convert signals from the directional sensor into digital signals and configured to output the digital signals to the image acquisition section.

16. A method for auto-tracking an image with an auto-tracking imaging apparatus, the auto-tracking imaging apparatus comprising:

an imaging optical system that is formed of a first optical system at a central portion thereof and a second optical system which is provided at the periphery of the first optical system and has an optical axis the same as that of the first optical system, where one of the optical systems is a wide-angle optical system, and the other is a telephoto optical system;

a directional sensor that has a plurality of pixels constituted of photoelectric conversion elements two-dimensionally arranged and a micro lens array or a light blocking mask, wherein the micro lens array or the light blocking mask pupil-divides rays incident through the wide-angle and telephoto optical systems such that the plurality of pixels selectively receive the rays;

a panning/tilting mechanism configured to rotate an imaging section, which includes the imaging optical system and the directional sensor, in horizontal and vertical directions;

an image acquisition section configured to acquire a wide-angle image, for which light is received from the directional sensor through the wide-angle optical system, and a telephoto image for which light is received from the directional sensor through the telephoto optical system;

an object detection section configured to detect a tracking target object on the basis of at least the wide-angle image in the wide-angle and telephoto images acquired by the image acquisition section; and a panning/tilting control section configured to control the panning/tilting mechanism on the basis of information about a position of the object, which is detected by the object detection section, in the image, the method comprising:

pupil-dividing rays incident through the wide-angle and telephoto optical systems with the micro lens array or the light blocking mask of the directional sensor such that the plurality of pixels selectively receive the rays;

rotating the imaging section with the panning/tilting mechanism;

acquiring the wide-angle image and the telephoto image with the image acquisition section;

detecting the tracking target object with the object detection section on the basis of at least the wide-angle image in the wide-angle and telephoto images acquired by the image acquisition section;

controlling the panning/tilting mechanism with the panning/tilting control section on the basis of the information about the position of the object, which is detected by the object detection section, in the image;

sending digital signals from the imaging section to the image acquisition section;

receiving digital signals from the imaging section in the image acquisition section;

sending digital signals from the image acquisition section to the object detection section;

receiving digital signals from the image acquisition section in the object detection section;

sending digital signals from the object detection section to the panning/tilting control section;

receiving digital signals from the object detection section in the panning/tilting control section;

sending digital signals from the panning/tilting control section to the panning/tilting mechanism; and receiving digital signals from the panning/tilting control section in the panning/tilting mechanism.

17. The method according to claim 16, wherein the imaging section further comprises an analog-to-digital converter configured to convert signals from the directional sensor into digital signals and configured to output the digital signals to the image acquisition section, and wherein the method further comprises:

converting signals from the directional sensor into digital signals with the analog-to-digital converter; and outputting the digital signals from the analog-to-digital converter to the image acquisition section.

18. The method according to claim 16, wherein the imaging section further comprises a digital signal processing section that performs signal processing of digital signals received from the image acquisition section, and wherein the method further comprises:

performing signal processing of digital signals with the digital signal processing section;

sending digital signals from image acquisition section to the digital signal processing section; and receiving digital signals from the image acquisition section in the digital signal processing section.

* * * * *